United States Patent
Nishioka (10) Patent No.: US 6,909,101 B2
(45) Date of Patent: Jun. 21, 2005

(54) WATER PURIFYING APPARATUS

(76) Inventor: Yoichi Nishioka, c/o Dynaflo Co., Ltd. 9-20, Koyama 2-chome, Shinagawa-ku, Tokyo (JP)

( * ) Notice: Subject to any disclaimer, the term of this patent is extended or adjusted under 35 U.S.C. 154(b) by 0 days.

(21) Appl. No.: 10/756,050

(22) Filed: Jan. 12, 2004

(65) Prior Publication Data

US 2004/0140435 A1 Jul. 22, 2004

Related U.S. Application Data

(63) Continuation-in-part of application No. PCT/JP02/06422, filed on Jun. 26, 2002.

(30) Foreign Application Priority Data

Jul. 12, 2001 (JP) ........................................ 2001-212391

(51) Int. Cl.[7] .............................. C02F 1/32; C02F 1/28
(52) U.S. Cl. ................... 250/436; 250/432 R; 250/435; 250/455.11; 210/85; 210/87; 210/97; 210/192; 210/282; 210/295; 210/501; 210/503; 210/504; 210/748
(58) Field of Search ............................... 250/436, 435, 250/432 R, 455.11; 210/85, 87, 97, 136, 143, 192, 282, 295, 501, 503, 504, 748

(56) References Cited

U.S. PATENT DOCUMENTS

| | | | | |
|---|---|---|---|---|
| 4,342,915 A | * | 8/1982 | Karamian ................... | 250/436 |
| 4,676,896 A | * | 6/1987 | Norton ....................... | 210/192 |
| 5,089,144 A | * | 2/1992 | Ozkahyaoglu et al. ...... | 210/767 |
| 5,344,558 A | * | 9/1994 | Kool .......................... | 210/117 |
| 5,393,419 A | * | 2/1995 | Tiede et al. ................. | 210/192 |
| 5,536,395 A | * | 7/1996 | Kuennen et al. ............. | 210/87 |
| 5,611,918 A | * | 3/1997 | Markham .................... | 210/87 |
| 6,258,265 B1 | * | 7/2001 | Jones ......................... | 210/202 |
| 6,798,342 B2 | * | 9/2004 | Addy ........................ | 340/539.1 |
| 2002/0130069 A1 | * | 9/2002 | Moskoff ...................... | 210/85 |
| 2004/0140435 A1 | * | 7/2004 | Nishioka .................... | 250/436 |

FOREIGN PATENT DOCUMENTS

| | | |
|---|---|---|
| JP | 60/155993 U | 10/1985 |
| JP | 09-029237 A | 2/1997 |
| JP | 10-118636 A | 5/1998 |

OTHER PUBLICATIONS

International Search Report from PCT/JP02/06837.

* cited by examiner

*Primary Examiner*—John R. Lee
*Assistant Examiner*—Bernard E. Souw
(74) *Attorney, Agent, or Firm*—Christensen, O'Connor Johnson Kindness PLLC (57) ABSTRACT

This invention is capable of providing a water purifying apparatus with a comparatively simple configuration that can be used easily.

First, a usage state is adopted by operating the knob of the faucet. In doing so, the detection means detects the flow of the water. As a result, the control unit supplies electricity to the ultraviolet light generator based on the detection signal form the detection means, and ultraviolet light is emitted. The emitted ultraviolet light then irradiates water within the passage. Water sterilization can then be carried out as a result of doing this. The ultraviolet light generator only generates light when the faucet is in use. It is therefore possible to utilize the ultraviolet light generator for long periods of time and savings are made with respect to power consumption. Further, a curving part is formed in the passage, and the ultraviolet light generator is arranged in the vicinity of the curving part. The time for which the water is irradiated with ultraviolet rays from the ultraviolet light generator is therefore made long, and the water purification efficiency is improved.

16 Claims, 7 Drawing Sheets

WATER PURIFYING APPARATUS

CROSS REFERENCE TO RELATED APPLICATION

This application is a continuation-in-part of prior International Application No. PCT/JP02/06422, filed Jun. 26, 2002, priority of which is hereby claimed under 35 U.S.C. § 120.

TECHNICAL FIELD

The preset invention relates to water purifying apparatus.

BACKGROUND ART

Purifying apparatus purifying water in tanks and piping using ultraviolet rays is well-known in the related art. However, apparatus of the related art have problems of being complex in configuration and large. In particular, in apparatus where purified water is temporarily accumulated in a tank, sanitary supervision of this water is required, and the apparatus is both complex and large.

As the present invention is based on these circumstances, it is therefore the object of the present invention to provide purifying apparatus of a comparatively simple structure that can be used easily.

DISCLOSURE OF THE INVENTION

The purifying apparatus of this invention purifies water being sent out of a faucet or tap. This water purifying apparatus is equipped with a main body, an ultraviolet light generator, and a control unit. The main body is equipped with a passage for allowing water to pass, the ultraviolet light generator is arranged so as to be capable of providing ultraviolet rays within the passage, and the control unit causes ultraviolet rays to be emitted from the ultraviolet generator when the faucet is in use.

The water purifying apparatus can be equipped with "detection means for outputting a detection signal detecting whether or not the faucet is in a used state to the control unit".

The detection means may also comprise a moveable member capable of moving in accordance with the flow of the water and a detector for detecting movement of the moveable member.

The detection means may also be equipped with a proximity sensor for detecting the proximity of users.

The detection means may also be equipped with a water pressure detector for detecting pressure of the water.

A configuration may also be adopted where the passage has a curving part and the ultraviolet light generator is arranged in the vicinity of the curving part.

A gap constituting part of the passage for the water may also be formed surrounding the ultraviolet light generator in the vicinity of the curving part.

The water purifying apparatus may also comprise a main body and an ultraviolet light generator, wherein the main body is equipped with a passage allowing water to pass, the ultraviolet light generator is arranged so as to be capable of providing ultraviolet rays within the passage, the passage has a curving part, and the ultraviolet light generator is arranged in the vicinity of the curving part.

A gap constituting part of the passage for the water may also be formed surrounding the ultraviolet light generator in the vicinity of the curving part.

The passage flowing downstream from the gap may narrow midway.

The ultraviolet light generator may also be equipped with an ultraviolet lamp.

The water purifying apparatus of the present invention may also be equipped with a display unit for displaying the lit state of the ultraviolet lamp or the change period.

The control unit can be equipped with a wireless transmitter. The display unit can be equipped with a receiver. As a result, it is possible to control operation of the display unit using a wireless signal from the control unit.

The ultraviolet lamp can be a filament-type ultraviolet lamp.

A portion at the inner surface of the passage and facing the ultraviolet generator may constitute a reflecting surface reflecting the ultraviolet rays.

Further, the main body can be equipped with a pipe connected to the gap and constituting part of the passage. The pipe can be equipped with an extending part extending in the direction of the gap between the ultraviolet light generator and the inner surface of the passage. The extending part sends the water in the direction of the gap between the ultraviolet light generator and the inner surface of the passage.

BEST MODE FOR CARRYING OUT THE INVENTION

Figure 1:
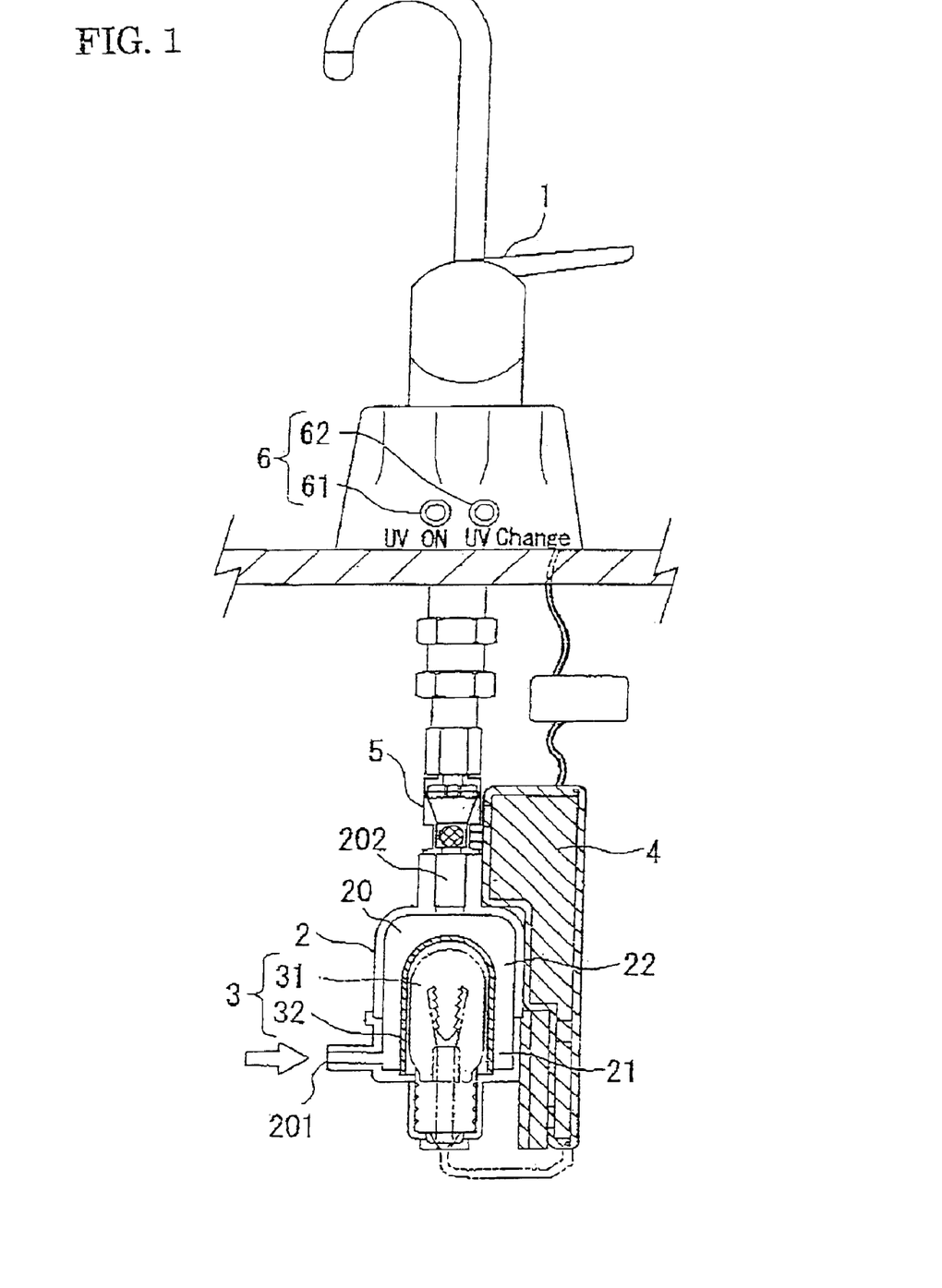
FIG. 1 is a cross-sectional view of the essential parts for illustrating an outline of a configuration for a purifying apparatus of a first embodiment of the present invention.
Figure 2:
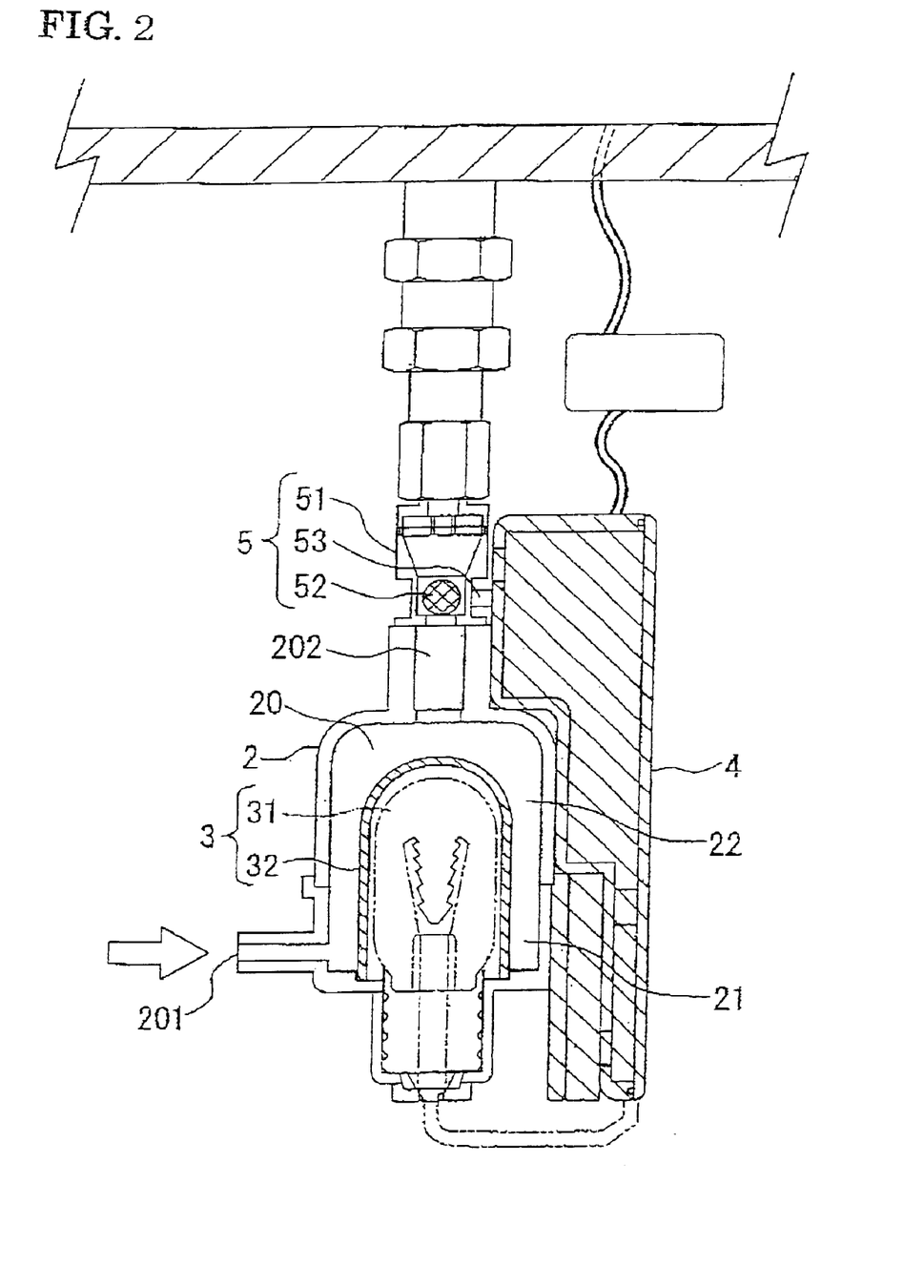
FIG. 2 is an enlarged view of FIG. 1.

The following is a description based on FIG. 1 and FIG. 2 of a purifying apparatus of a first embodiment of the present invention. This purification device is a purification device for purifying water being sent out of a faucet 1. Here, water may be arbitrary water such as tap water, well water, or river water, etc. The purifying apparatus of this embodiment comprises a main body 2, ultraviolet light generator 3, control unit 4, detection means 5, and display unit 6.

The main body 2 is equipped with a passage 20 allowing water to pass provided within. An inflow port 201 of the passage 20 is connected to a water supply side (for example, mains water piping or output side piping of a pump sending water out). An outlet port 202 of the passage 20 is connected to the side of the faucet 1 via a guide 51 (described later) of detection means 5 and a well-known connector. Of course, the outlet port 202 may also be directly connected to the faucet 1. The main body 2 may be configured from a single body, or may also be configured from a combination of a plurality of components.

The passage 20 has a curving part 21. In this embodiment, the curving part 21 is positioned at a substantially central position of the passage 20. Therefore, in this embodiment, the passage 20 is bent into a substantially L-shape as viewed in cross-section. The angle of bending of the curving part 21 is approximately 90 degrees in this embodiment but is not particularly limited, and may be selected in a range of, for example, 60 to 120 degrees. The ultraviolet light generator 3 (described later) is arranged in the vicinity of the curving part 21. A gap 22 constituting part of the passage 20 is formed in the vicinity of the curving part 21 at the periphery of the ultraviolet light generator 3. This gap 22 is formed along the entire periphery of the ultraviolet light generator 3. Namely, water in the passage 20 flows downwards by passing through the gap 22. Further, the passage 20 going from the gap 22 towards the outlet port 202 narrows (refer to FIG. 2) midway (in the vicinity of the outlet port 202).

The ultraviolet light generator 3 is equipped with an ultraviolet lamp 31 and cover 32. A power supply (now shown) is connected to the ultraviolet lamp 31 via the control unit 4. The ultraviolet light generator 3 is positioned facing the passage 20, and is capable of providing ultraviolet rays to within the passage 20. The cover 32 covers the periphery of the ultraviolet lamp 31 in order to protect the water from being heated up by the ultraviolet lamp 31. It is preferable for the material of the cover 32 to be transparent and be, for example, quartz glass.

The control unit 4 is configured so as to generate ultraviolet light from the ultraviolet light generator 3 when the faucet 1 is used. More specifically, when a detection signal indicating that the faucet 1 is in use is received from the detection means 5 described later, electricity is supplied to the ultraviolet lamp 31 so as to enable generation of light, and when the detection signal is no longer present, supply of electricity is stopped. While electricity is being supplied to the ultraviolet light generator 3, the control unit 4 supplies electricity to a lighting state display unit 61 (described later), so that light is generated. Further, the control unit 4 is equipped with an arbitrary timer mechanism (not shown) and when a set lifespan for the ultraviolet light generator 3 is reached, electricity is supplied to a change period display unit 62 (described later) and light is emitted. A configuration where drops in voltage due to the passage of time for the battery used within the control unit 4 are detected and used as a trigger can be considered as an example of a timer mechanism. The control unit 4 carrying out the aforementioned operation can be easily configured using elements such as ICs etc. and a more detailed description is omitted.

The detection means 5 is for outputting a detection signal detecting whether or not the faucet 1 is in use to the control unit 4. More specifically, the detection means 5 is equipped with a guide 51, movable member 52, and detector 53 (refer to FIG. 2). The guide 51 is cylindrical and has a passage formed within. The guide 51 is connected to the outlet port 202 of the main body 2 so that water passing through the main body 2 passes through this internal passage and flows to the faucet 1. The movable member 52 moves in accordance with the flow of water. Specifically, the movable member 52 is positioned in a moveable state within the passage formed at the guide 51. Here, the movement stroke of the movable member 52 can be small providing that movement is small to an extent that can be detected. The shape of the movable member 52 is, for example, spherical. The detector 53 detects movement of the moveable member. Specifically, the detector 53 is equipped with an LED (not shown) for emitting light in the direction of the movable member 52, and a light-receiving element (not shown) for detecting light reflected from the movable member 52. An LED emitting, for example, infra-red light can be utilized as the LED. A high-sensitivity phototransistor can be utilized as the light-receiving element. When the movable member 52 moves, the amount of light reflected for light from the LED fluctuates. It is therefore possible to detect movement of the movable member 52 at the detector 53 by detecting the amount of reflected light using a light-receiving element. Namely, in this example, an output signal from the light-receiving element constitutes a detection signal indicating the usage state of the faucet 1.

The display unit 6 is arranged at the lower part of the faucet 1 (refer to FIG. 1). The display unit 6 is equipped with the lighting state display unit 61 for indicating that the ultraviolet light generator 3 is generating light, and a change period display unit 62 indicating the change period of the ultraviolet lamp 31. The lighting state display unit 61 is, for example, a green LED, and the change period display unit 62 is, for example, a red LED. The lighting state display unit 61 and the change period display unit 62 illuminate in accordance with control of the control unit 4.

Next, a description is given of the operation of the water purifying apparatus of the embodiment configured in the aforementioned manner. First, the knob of the faucet 1 is operated, and is taken as the state for which water is outputted from the faucet 1 (namely the usage state of the faucet 1). In doing so, water flows in to the passage 20 of the main body 2 by water pressure, and the movable member 52 moves slightly in a downwards direction (upwards in FIG. 1 and FIG. 2). In doing so, the detector 53 detects this movement, and a detection signal is sent to the control unit 4. The control unit 4 then supplies electricity to the ultraviolet lamp 31 of the ultraviolet light generator 3 based on the detection signal, and ultraviolet light is emitted. Emitted ultraviolet light irradiates water within the passage 20 so as to sterilize this water. When use of the faucet 1 is stopped, the control unit 4 detects this using an operation that is the reverse of that described above, and supply of electricity to the ultraviolet light generator 3 is stopped.

In this embodiment, the ultraviolet light generator 3 only emits light when the faucet 1 is in use. Water is therefore only irradiated with ultraviolet light when necessary, and irradiation is stopped when not necessary. It is therefore possible to utilize the ultraviolet light generator 3 for a long period of time, which has the advantage that savings can also be made regarding power consumption.

Further, in this embodiment, the detection means 4 can be of a simple construction as described above, the structure is simple, and can be provided cheaply. In addition, there is the benefit that the water purifying apparatus of this embodiment can easily be fitted utilizing a conventional faucet.

Further, in this embodiment, the curving part 21 is formed at the passage 20 and the ultraviolet light generator 3 is arranged in the vicinity of the curving part 21, which has the following benefits. Namely, as a result of the curving, water flowing through the curving part 21 collides with the wall so as to be slowed down and experience turbulence and retention time in the vicinity of this location is extended. In this way, the time ultraviolet light from the ultraviolet light generator 3 irradiates the water for can be extended, and the efficiency of water purification can be improved.

Further, in this embodiment, the gap 22 constituting part of the passage 20 is formed about the periphery of the ultraviolet light generator 3 in the vicinity of the curving part 21, so that water passing through the passage 20 passes in the vicinity of the ultraviolet light generator 3. The intensity of the ultraviolet light is stronger closer to the light source. Therefore, according to this embodiment, it is possible to irradiate the water with ultraviolet light of a strong intensity, and water purification efficiency can be further improved. In addition, while the water passes through the gap 22, the water goes around the perimeter of the ultraviolet light generator 3, and the retention time is therefore further extended at the curving part 21. In particular, the gap 22 is formed about the entire periphery of the ultraviolet light generator 3. It is therefore easy for water to go around the circumference of the ultraviolet light generator 3. Therefore, according to this embodiment, it is possible to obtain a still higher water purification efficiency.

Moreover, in this embodiment, the passage 20 narrows midway in a direction flowing downwards from the gap 22. The time the water flowing in the passage 20 stays in the vicinity of the ultraviolet light generator 3 can therefore by further extended, and the water purification rate is still further improved.

Further, in this embodiment, a display unit 6 displaying the changing period of the ultraviolet lamp taken as the ultraviolet light generator 3 is provided. This therefore has the benefit that the changing period of the lamp can be easily understood.

Figure 3:
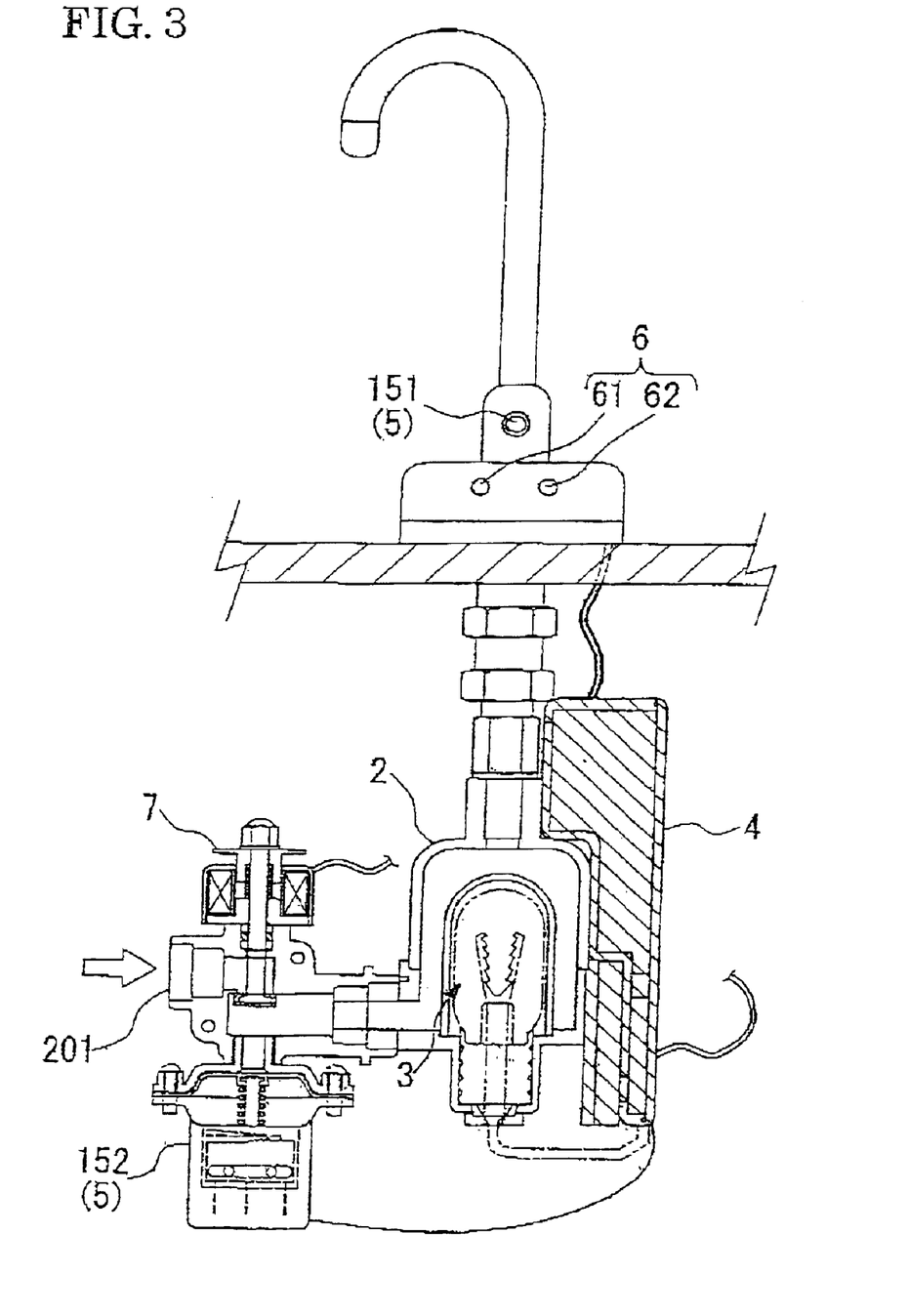
FIG. 3 is a cross-sectional view of the essential parts for illustrating an outline of a configuration for a purifying apparatus of a second embodiment of the present invention.
Figure 4:
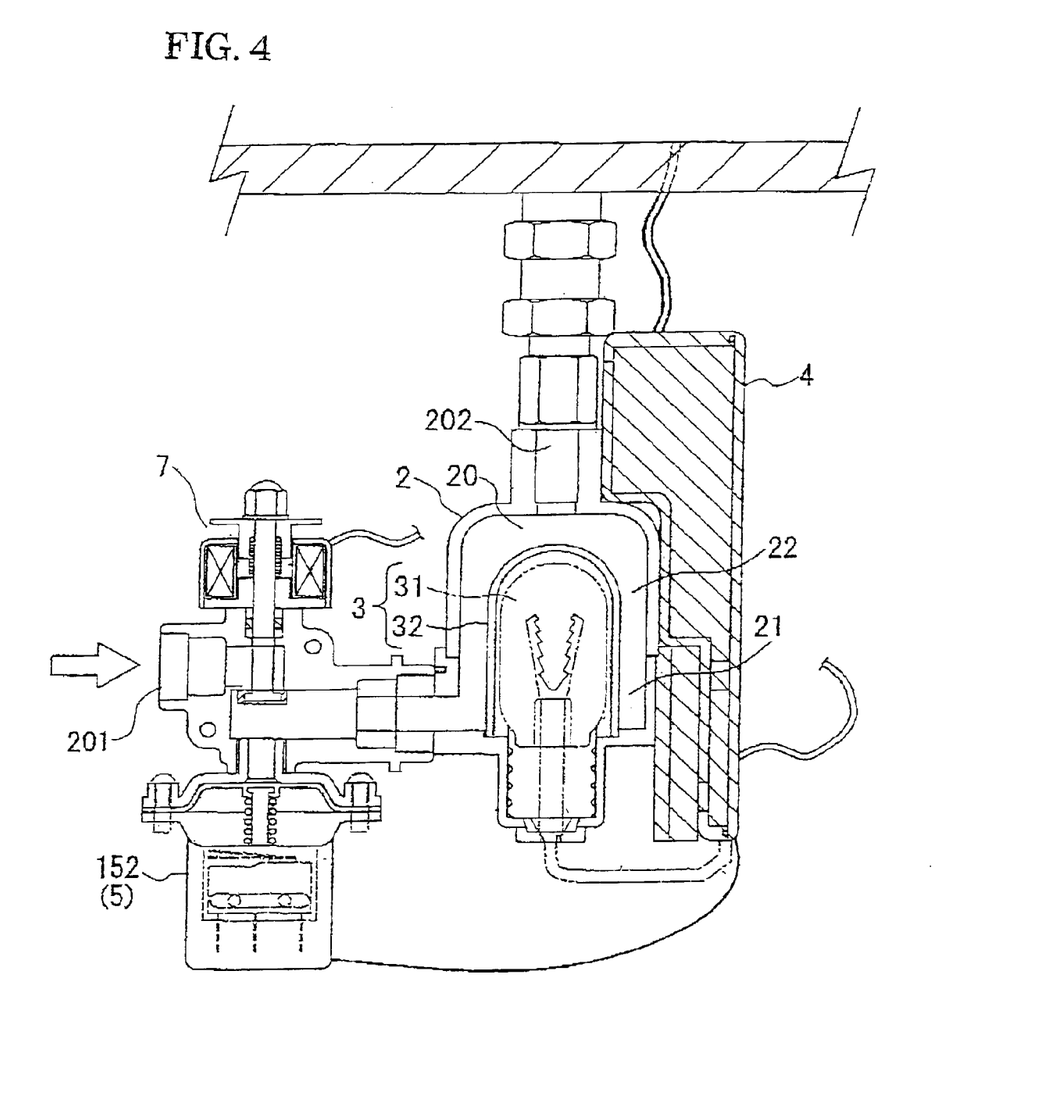
FIG. 4 is an enlarged view of FIG. 3.

Next, a description is given based on FIG. 3 and FIG. 4 of a purifying apparatus of a second embodiment of the present invention. With the water purifying apparatus of the first embodiment described above, a configuration is equipped with a movable member 52 etc. as detection means 5. However, in the second embodiment, in place of this, a proximity sensor 151 connected to the control unit 4 and a water pressure detector 152 are provided as the detection means 5. The proximity sensor 151 is configured so as to send a detection signal to the control unit 4 when a user is close by. It is possible to use, for example, an infra-red sensor or ultrasonic sensor (a sensor detecting reflection of ultrasonic waves) as the proximity sensor 151. This kind of sensor is well-known. The water pressure detector 152 is configured from a diaphragm, and a detection mechanism (not shown) for detecting movement of this diaphragm. If water pressure in the passage is then greater than a specified value, then the control unit 4 is made aware of this. Further, with the water purifying apparatus of this embodiment, a solenoid valve 7 is fitted to the water passage. The solenoid valve 7 is put into an open state by the control unit 4 based on a detection signal from the proximity sensor 151.

According to the water purifying apparatus of the second embodiment, the proximity of a user to the faucet 2 can be detected by the proximity sensor 151. After detection, the control unit 4 puts the solenoid valve 7 into an open state to that sending of water is possible. In this embodiment, the water pressure detector 152 is used. Supply of electricity to the ultraviolet light generator 3 can therefore be started via the control unit 4 from when it is detected that water pressure due to the supplying of water is greater than a specified value. By doing this, it is possible to put the ultraviolet light generator 3 into a stop state even when there is not sufficient water pressure in the passage even when the solenoid valve 7 is open. In this way, damage to the lamp 31 is prevented because water is supplied after the ultraviolet lamp 31 generates heat. A further configuration and operation for water purifying apparatus of the second embodiment is the same as for the first embodiment, with the same numerals being assigned and a detailed description therefore being omitted.

Figure 5:
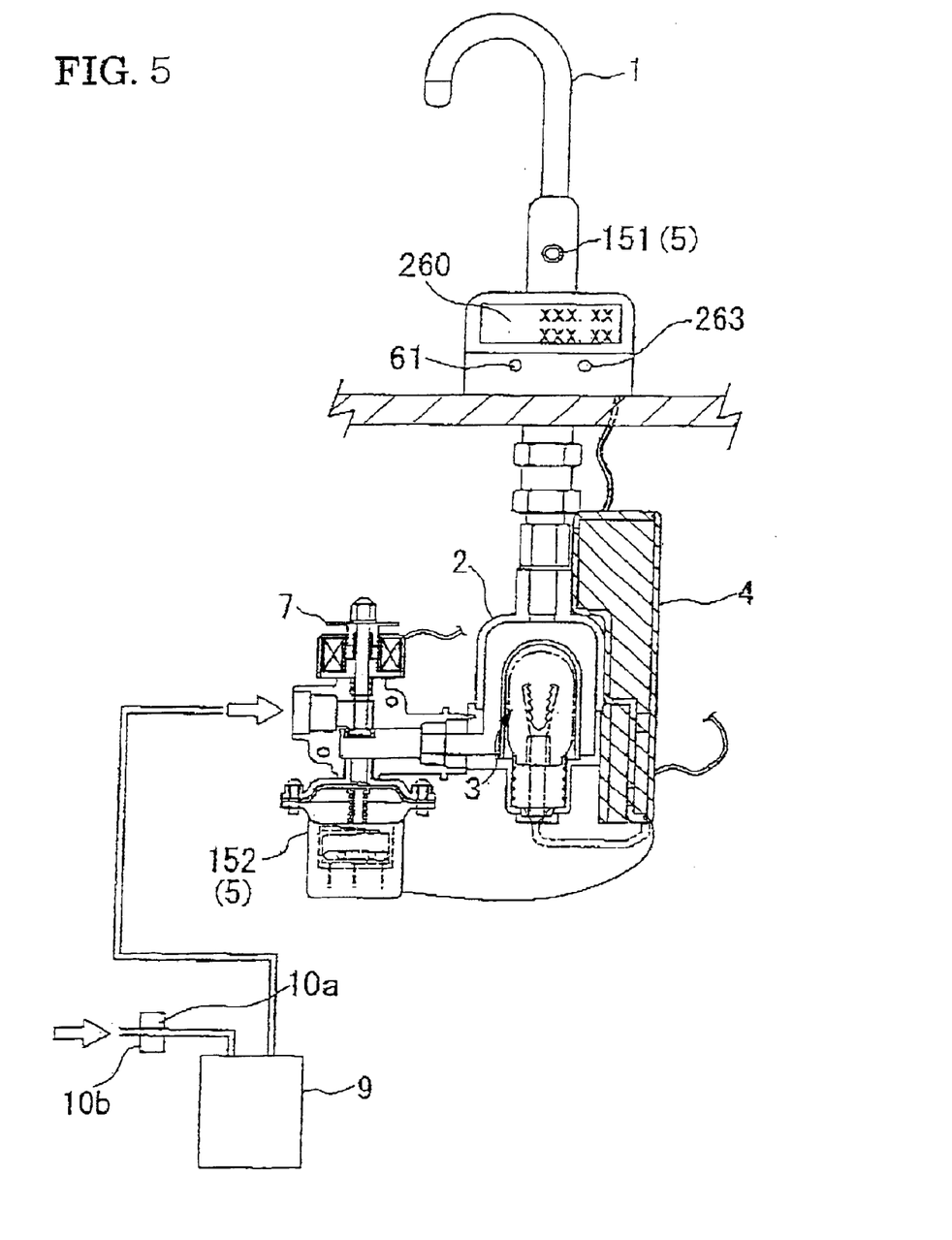
FIG. 5 is a cross-sectional view of the essential parts for illustrating an outline of a configuration for a purifying apparatus of a third embodiment of the present invention.
Figure 6:
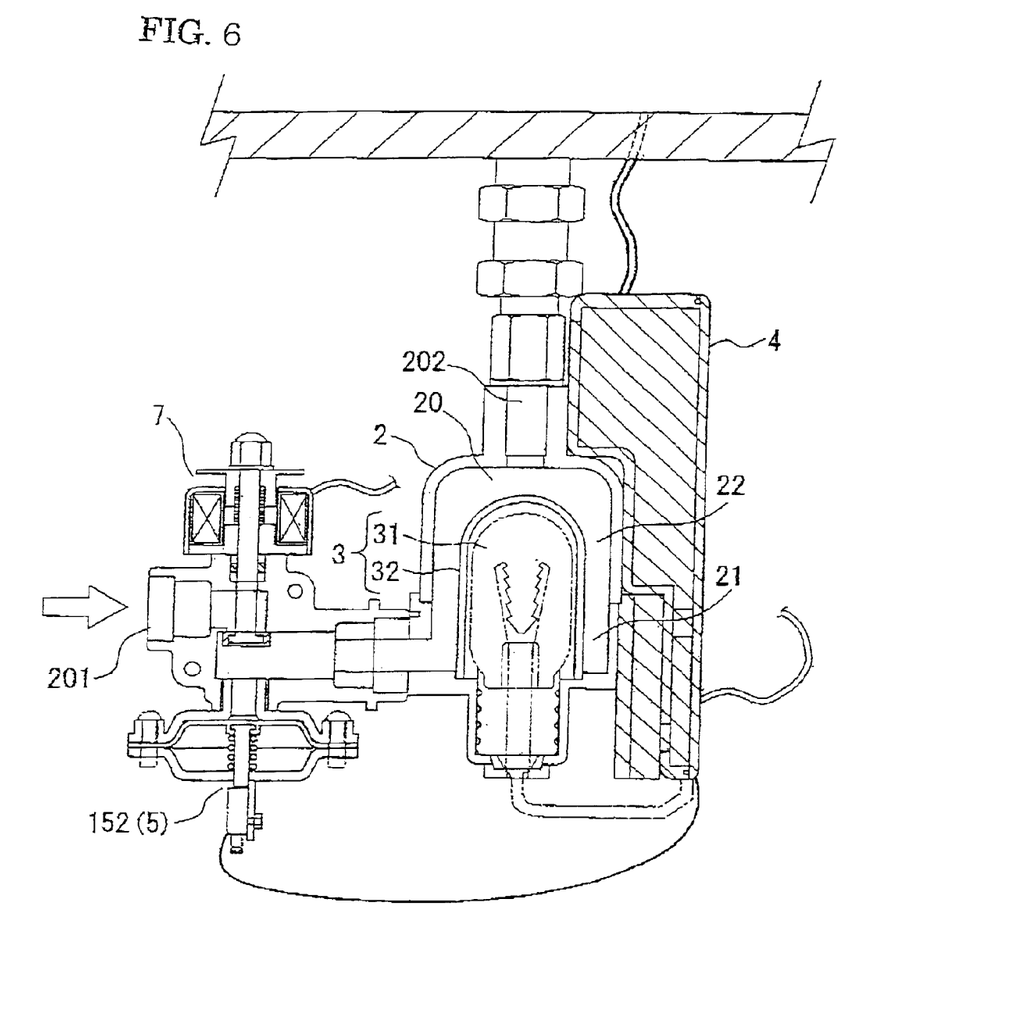
FIG. 6 is an enlarged view of FIG. 5.

Next, a description is given based on FIG. 5 and FIG. 6 of a purifying apparatus of a third embodiment of the present invention. In this embodiment, a display unit 260 is used in place of the display unit 6 (refer to FIG. 5). A display displaying the lifespan of the ultraviolet lamp 31 and the lifespan of the filter 9 (refer to FIG. 5) used on the upstream side of the passage 20 as a string of numerals can be used as the display unit 260. This display is, for example, a liquid crystal display. The lifespan of the filter 9 can be ascertained, for example, as follows. Namely, a phototransistor 10*a* and an infra-red LED 10*b* are arranged facing each other on the upstream side of the filter 9, with the lifespan being estimated at the control unit 4 based on the extent to which water detected in this manner is polluted. Further, in this embodiment, if the changing period for the filter 9 arrives, the LED 263 taken as part of the display unit 6 is made to light up.

Remaining configuration and operation for water purifying apparatus of the third embodiment is the same as for the each of the embodiments, with the same numerals being assigned and a detailed description therefore being omitted.

The above described embodiments and practical examples are merely given as examples and in no way show indispensable configurations of the present invention. Each part of the configuration is not limited to that stated above providing that the essential essence of the present invention is achieved.

For example, in the above embodiments, electricity is supplied via wiring (refer to FIG. 1) to the lighting state display unit 61 from the control unit 4 and this is made to emit light. However, it is also possible for the control unit 4 to be provided with a wireless transmitter and for the display unit 61 to be provided with a receiver. In this case, a power supply (for example, a battery) and a controller are set up at the display unit 61. As a result of doing this, the wiring is omitted, instructions are sent to the controller in a wireless manner, and the turning on and off of emission of the display unit 61 can be controlled by instructions from the controller. By omitting wiring in this manner, it is no longer necessary to make holes for wiring in a table top fitted with the faucet 1. Therefore, in cases where it is difficult to make a hole in the tabletop such as in cases where the table top is marble, etc., installation of this water purifying apparatus is straightforward.

Figure 7:
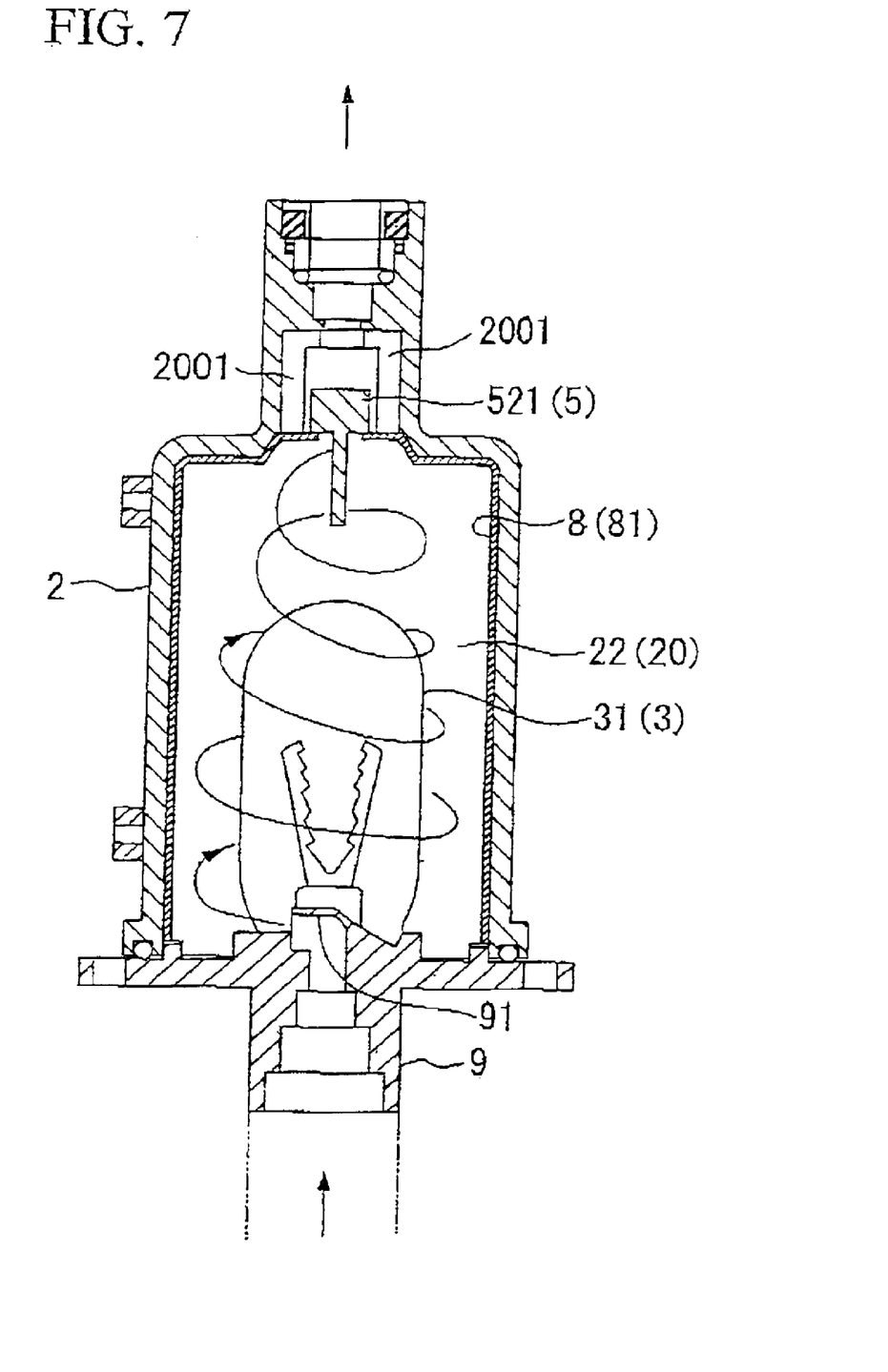
FIG. 7 is a cross-sectional view of the essential parts for illustrating an outline of a configuration for a purifying apparatus of a fourth embodiment of the present invention.

Next, a description is given with reference to FIG. 7 of a water purifying apparatus of a fourth embodiment of the present invention. In this embodiment, a filament-type lamp is used as the ultraviolet lamp 31. It is appropriate to employ a lamp with, for example, an output in the order of 18 to 20 W with output light including wavelength components in the vicinity of 275 nm as the filament-type ultra-violet lamp. An example configuration for this kind of lamp is shown below.

Filament: Tungsten (enclosed within a glass tube)

Ultraviolet Light Generating Source: Plate applied with mercury amalgam (enclosed within a glass tube)

Glass tube material: Ultraviolet light-transmitting glass (for example, an arbitrary glass such as borosilicated glass 9741 etc. by Corning Incorporated).

Lamp drive voltage: approximately 12V.

Further, in the first embodiment the movable member 52 of the detection means 5 is taken to be a ball-shape but in the fourth embodiment, a plug-shaped moveable member 521 is employed. In this embodiment also, when movement of the moveable member 521 is detected by the detector 53 (refer to FIG. 2), the ultraviolet lamp 31 lights up. In the fourth embodiment, installation of the cover 32 surrounding the ultraviolet lamp 31 is omitted. Further, in the fourth embodiment, a plurality of ribs 2001 projecting in a direction to the inside are formed at the inner surface of the passage 20 at a portion facing the moveable member 521.

Spaces are formed between each of the ribs 2001 to make the passage of fluid easy. The ribs 2001 extend to the vicinity of the outer periphery of the moveable member 521 and as a result, the range of permissible movement of the moveable member 521 is restricted. The moveable member 21 is capable of moving along the passage in a direction from front to rear (a direction from top to bottom in FIG. 7).

Further, in the fourth embodiment, a reflecting part 8 is provided at the inner surface of the passage 20 of the main body 2. In this embodiment, the reflecting part 8 is cylindrical in shape and made of stainless steel. In this way, the portion at the inner surface of the passage 20 and facing the ultraviolet light generator 3 is the reflecting surface 81 reflecting the ultraviolet rays. Any material that reflects ultraviolet rays well may be used as the material of the reflecting surface 81 but the material preferably has strong resistance to corrosion.

Further, the main body 2 of the fourth embodiment is equipped with a pipe 9. This pipe 9 is connected to the gap 22 inside the main body 2. Moreover, the pipe 9 forms part of the passage 20. This pipe 9 is equipped with an extending part 91 extending in the direction of the gap 22 between the ultraviolet lamp 31 (ultraviolet light generator) and the inner surface of the passage 20 (refer to FIG. 7). The extending part 91 sends water in the direction of the gap 22 between the ultraviolet lamp 31 and the inner surface of the passage 20.

With the water purifying apparatus of the fourth embodiment, the ultraviolet lamp 31 is a filament type. This is different from the discharge tube type, and it is possible for lighting up to take place immediately when necessary. When the ultraviolet lamp is a discharge tube type, it is not possible for lighting up to take place immediately at the time of use, and it was therefore necessary for the lamp to always be lit. If this is not the case, there is the fear that water that has not yet been sterilized will be supplied. With regards to this, with the apparatus of the fourth embodiment, a filament-type ultraviolet lamp 31 is used. The lamp 31 is therefore immediately illuminated when water flow is detected by the detection means 5 and sterilizing is carried out. It is therefore not necessary for the lamp 31 to usually be illuminated, the lifespan of the lamp 31 can be prolonged, and running costs for the apparatus can be reduced. Moreover, the filament-type ultraviolet lamp 31 is smaller than the discharge tube-type, and the overall apparatus can therefore be made smaller.

Further, in this embodiment, the ultraviolet lamp 31 is a filament-type lamp which has the following benefits. As described above, when the ultraviolet lamp is a discharge tube type, it is necessary for the lamp to always be lit because it takes time for the lamp to light. As a result, surrounding water is heated by the lamp when the water is not being used. After this, when the water is used, cold (not-yet heated) water comes into contact with the lamp. As a result, the lamp is rapidly cooled by the water, and glass of which the lamp is composed cracks. Because of this, when the discharge tube-type ultraviolet lamp is used, a cover protecting the lamp is necessary. With respect to this, with the apparatus of this embodiment, a filament-type lamp is adopted as the ultraviolet lamp 31. Therefore, as described above, the ultraviolet lamp 31 is turned off when water is not being used. Because of this, water surrounding the ultraviolet lamp 31 is substantially not heated. Therefore, if, after this, the water starts to be used, even if cold (not-yet heated) water comes into contact with the lamp 31, the temperature difference of the water is small and the lamp therefore does not crack. With the apparatus of this embodiment, it is possible to omit the installation of a cover for protecting the lamp 31. The apparatus can therefore be made small and the cost of manufacturing the apparatus can be kept down.

Further, in this embodiment, the ultraviolet lamp 31 is a filament type. The drive voltage for the lamp can therefore be kept low at, for example, approximately 12V. With regards to this, when the lamp is a discharge type, it is necessary to use a high-voltage and strict safety measures are necessary in order to prevent electric shocks at the time of water leaks etc., and the apparatus therefore becomes expensive. With the apparatus of this embodiment, however, it is possible to make the drive voltage low. The danger from electric shocks is therefore low, and the cost of the apparatus can therefore be kept down.

Moreover, with the apparatus of this embodiment, a portion at the inner surface of the passage 20 that is facing the ultraviolet lamp 31 is taken as a reflecting surface 81 for reflecting the ultraviolet rays. The water is therefore also sterilized by ultraviolet rays reflected by the reflecting surface 81. This is therefore capable of improving water sterilization efficiency.

Further, with the apparatus of this embodiment, the pipe 9 has an extending part 91. It is therefore possible for water to be sent in a direction between the ultraviolet lamp 31 and the inner surface of the passage 20 by the extending part 91. In doing so, as shown in FIG. 7, water that is sent flows downstream in a spiral shape while orbiting the surroundings of the ultraviolet lamp 31. The time for which the water is irradiated by ultraviolet rays can therefore be made longer and it is possible to reliably sterilize the water. Other aspects and advantages of the fourth embodiment are substantially the same as for the first embodiment and description thereof is omitted. However, in the fourth embodiment, the curving part 21 of the first embodiment does not exist.

FIELD OF INDUSTRIAL UTILIZATION

According to the present invention, it is possible to provide a water purifying apparatus with a comparatively simple configuration that can be used easily.

What is claimed is:

1. A water purifying apparatus for purifying water sent to a faucet, comprising a main body, an ultraviolet light generator, a control unit, a proximity sensor for detecting proximity of a user, and detection means for outputting a detection signal detecting whether or not the faucet is in a used state to the control unit, wherein said main body is equipped with a passage allowing water to pass, the ultraviolet light generator is arranged so as to be capable of providing ultraviolet rays within the passage, the control unit causes ultraviolet rays to be emitted from the ultraviolet light generator at the time of using the faucet, and the detection means comprises a moveable member capable of moving in accordance with the flow of the water and a detector for detecting movement of the moveable member.

2. A water purifying apparatus for purifying water sent to a faucet, comprising a main body, an ultraviolet light generator, a control unit, detection means for outputting a detection signal detecting whether or not the faucet is in a used state to the control unit, and a proximity sensor for detecting proximity of a user, wherein said main body is equipped with a passage allowing water to pass, the ultraviolet light generator is arranged so as to be capable of providing ultraviolet rays within the passage, the control unit causes ultraviolet rays to be emitted from the ultraviolet light generator at the time of using the faucet, and the detection means comprises a moveable member capable of moving in accordance with the flow of the water and a detector for detecting movement of the moveable member.

3. The purifying apparatus as disclosed in claim 1, wherein the detection means is equipped with a water pressure detector for detecting water pressure of the water.

4. The purifying apparatus as disclosed in claim 2, wherein the detection means is equipped with a water pressure detector for detecting water pressure of the water.

5. The water purifying apparatus as disclosed in claim 1, wherein the passage has a curving part, and the ultraviolet light generator is arranged in the vicinity of the curving part.

6. The water purifying apparatus of claim 5, wherein a gap constituting part of the passage for the water is formed surrounding the ultraviolet light generator in the vicinity of the curving part.

7. A water purifying apparatus comprising a main body and an ultraviolet light generator, wherein the main body is equipped with a passage allowing water to pass, the ultraviolet light generator is arranged so as to be capable of providing ultraviolet rays within the passage, the passage has a curving part, the ultraviolet light generator is arranged in the vicinity of the curving part, and a gap constituting part of the passage for the water is formed surrounding the ultraviolet light generator in the vicinity of the curving part, the passage going downstream from the gap narrows midway.

8. The water purifying apparatus as disclosed in claim 1, wherein the ultraviolet light generator is equipped with an ultraviolet lamp.

9. The water purifying apparatus as disclosed in claim 8, further comprising a display unit for displaying a lit state and/or change period for the ultraviolet lamp.

10. The water purifying apparatus as disclosed in claim 9, wherein the control unit is equipped with a wireless transmitter, the display unit is equipped with a receiver, and as a result, it is possible to control operation of the display unit using a wireless signal from the control unit.

11. The water purifying apparatus as disclosed in claim 8, wherein the ultraviolet lamp is a filament-type ultraviolet lamp.

12. The water purifying apparatus as disclosed in claim 1, wherein a portion at the inner surface of the passage and facing the ultraviolet generator constitutes a reflecting surface.

13. The water purifying apparatus as disclosed in claim 7, wherein a portion at the inner surface of the passage and facing the ultraviolet generator constitutes a reflecting surface.

14. The water purifying apparatus as disclosed in claim 7, wherein the main body is equipped with a pipe connected to the gap and constituting part of the passage, the pipe is equipped with an extending part extending in the direction of the gap between the ultraviolet light generator and the inner surface of the passage, and the extending part sends the water in the direction of the gap between the ultraviolet light generator and the inner surface of the passage.

15. The water purifying apparatus as disclosed in claim 2, wherein the passage has a curving part, and the ultraviolet light generator is arranged in the vicinity of the curving part.

16. The water purifying apparatus of claim 15, wherein a gap constituting part of the passage for the water is formed surrounding the ultraviolet light generator in the vicinity of the curving part.

* * * * *

UNITED STATES PATENT AND TRADEMARK OFFICE
CERTIFICATE OF CORRECTION

PATENT NO.         : 6,909,101 B2  Page 1 of 1
APPLICATION NO. : 10/756050
DATED                  : January 12, 2004
INVENTOR(S)        : Y. Nishioka It is certified that error appears in the above-identified patent and that said Letters Patent is hereby corrected as shown below:

| COLUMN | LINE | ERROR |
|---|---|---|
| (63) Pg. 1, col. 1 | Related U.S. Application Data | "PCT/JP02/06422, filed on Jun. 26, 2002" should read --PCT/JP02/06837, filed Jul. 5, 2002-- |

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,909,101 B2 | Page 1 of 1 |
| APPLICATION NO. | : 10/756050 | |
| DATED | : June 21, 2005 | |
| INVENTOR(S) | : Y. Nishioka | |

It is certified that error appears in the above-identified patent and that said Letters Patent is hereby corrected as shown below:

| COLUMN | LINE | ERROR |
|---|---|---|
| (63)<br>Pg. 1, col. 1 | Related U.S.<br>Application<br>Data | "PCT/JP02/06422, filed on Jun. 26, 2002" should read<br>--PCT/JP02/06837, filed Jul. 5, 2002-- |

This certificate supersedes the Certificate of Correction issued July 1, 2008.

Signed and Sealed this

Twenty-second Day of July, 2008

JON W. DUDAS
*Director of the United States Patent and Trademark Office*